United States Patent [19]

Meyer et al.

[11] 4,410,966
[45] Oct. 18, 1983

[54] METHOD AND APPARATUS FOR DETECTION OF INSOLUBLE SINKING POLLUTANTS

[75] Inventors: Raymond A. Meyer, Thousand Oaks, Calif.; Larry F. Marx, Bellevue, Wash.; John E. Brugger, Hightstown, N.J.

[73] Assignee: The United States of America as represented by the Administrator of Environmental Protection Agency, Washington, D.C.

[21] Appl. No.: 261,764

[22] Filed: May 8, 1981

[51] Int. Cl.³ ........................ G01S 15/02; G01S 7/52
[52] U.S. Cl. ...................................... 367/87; 367/106; 367/113
[58] Field of Search ................. 367/87, 106, 113, 115, 367/99, 107; 73/592, 596, 597, 598

[56] References Cited

U.S. PATENT DOCUMENTS

| | | | |
|---|---|---|---|
| 3,332,056 | 7/1967 | Drenkelfort | 367/113 |
| 3,388,377 | 6/1968 | Folsom et al. | 367/113 |
| 3,742,438 | 6/1973 | Brede et al. | 367/115 |
| 3,746,121 | 7/1973 | Niklas | 367/113 |
| 4,001,764 | 1/1977 | Holland et al. | 367/106 |

OTHER PUBLICATIONS

Meyer et al., *Proc. 1980 National Confer. on Control of Hazardous Material Spills*, May 13–15, 1980, pp. 168–173.
Heath Co. Manual, Depth Sounders MI-1030 and MI-2900, pp. 1–31.

*Primary Examiner*—Richard A. Farley

[57] ABSTRACT

A method and apparatus for locating and mapping a pool of a pollutant (12) in a body of water (11) comprising the steps of scanning the bottom of said body of water with ultrasonic energy using a transducer (10) periodically pulsed to project pulse envelopes of acoustic energy downwardly to the bottom (14) of the body of water and receiving echo returns from the bottom preceded by echo returns from a reflective interface (13) with a pool of pollutant, if present. The presence of an echo return from an interface (13) as a precursor to an echo return from the bottom indicates the presence of the pool of pollutant at the navigational position of the transducer as the process of scanning continues. Locating and marking the perimeter of the pool permits rapid clean up operations to be directed.

14 Claims, 9 Drawing Figures

Time, 20 μs per division
CLEAN BOTTOM

Time, 20 μs per division
POLLUTANT LAYER ON BOTTOM

| Reference Voltage Levels | Voltage (mv) | FIG. 4 Time (μs) | FIG. 5 Time (μs) |
|---|---|---|---|
| 1 | 15 | 1040 | 1020 |
| 2 | 25 | 1040 | 1025 |
| 3 | 50 | 1045 | 1060 |
| 4 | 200 | 1050 | 1070 |
| 5 | 500 | 1055 | 1080 |
| 6 | 1000 | 1060 | 1085 |

METHOD AND APPARATUS FOR DETECTION OF INSOLUBLE SINKING POLLUTANTS

ORIGIN OF INVENTION

The invention described herein resulted from Contract No. 68-03-2648 between the U.S. Environmental Protection Agency and Rockwell International Corporation.

BACKGROUND OF THE INVENTION

This invention relates to the detection of insoluble (solubility less than 0.1 percent) pollutants that sink in water, and more particularly to the method and apparatus for locating and mapping pools of a pollutant in a body of water.

Spills or releases of hazardous materials into waterways and lakes cause severe environmental impact that could result in massive fish kills or contamination of municipal water supplies. Many of these hazardous materials are immiscible and denser than water. This class of pollutants may sink rapidly to the bottom of a still body of water forming localized pools. If turbulence is present, as in a river, they will remain suspended in the water until they reach a quiescent area of the watercourse where they may settle into a pool along the bottom. A pollutant mapping technique is needed to locate the hazardous material and direct rapid cleanup operations to minimize widespread biological and environmental impact.

Of all forms of energy which may be considered for scanning a body of water in search of pools of pollutants, sound is the most promising because it travels through water the best. In turbid, muddy water conditions, radiation (both light and radio waves) are attenuated to a far greater degree than is sound. Because of its relative ease of propogation, ultrasonic sound systems are used for depth sounding, fish finding, environmental monitoring, biomedical research, and metallurgy applications, as well as exploration of seas, rivers, and lakes. Ultrasonics and more particularly catacoustics (reflected sounds) form the framework for the pollutant mapping technique of the present invention.

SUMMARY OF THE INVENTION

In accordance with the present invention, one or more ultrasonic transducers are used to scan a body of water in search of a pool of pollutant. The transducers are periodically pulsed to project pulse envelopes of energy in the 200 kHz to 1 MHz frequency range downwardly to the bottom. Echo sounding techniques are then used to measure the time for a sonic signal to go from the transducer face to a reflective interface of the water with either the pool of pollutant and again with the bottom, or just the bottom, back to the transducer face. In the case of reflection from only the bottom, a strong echo signal is noted, but in the case of reflection from the interface between the water and a pool of pollutant before any reflection from the bottom, a precursor echo signal to the bottom echo signal is an indication of the presence of a pollutant pool. The duration of the precursor is a measure of the thickness of the pool. If the pollutant pool is detached from the bottom, the precursor will also be detached from the normal bottom return by a period that is proportional to the distance between the pool and the bottom. The term "bottom" as used herein refers generically to the bed of any body of water of sufficient size to require use of the invention.

These echo signals may be displayed on an oscilloscope. While observing real time display on the oscilloscope, the navigational position of the transducer is noticed as soon as the presence of a precursor is detected. To scan a larger swath, several transducers may be spaced apart on a boom and sequentially operated in a repetitive pattern. In that case digital techniques are preferably employed for converting echo return amplitudes from analog to digital form in order to determine by digital data analysis the presence and duration of precursors to strong echo returns from the bottom. An exemplary technique for accomplishing this is to measure the times at which echo signals exceed predetermined reference levels following a transmitted sonic pulse. These times may be recorded with navigational position data for later analysis. The presence of a pool is determined from an analysis of this data by the difference in the rate at which successive lower reference voltages are exceeded relative to the rate at which successive higher reference voltages are exceeded as a precursor grows in amplitude and is followed by a growing strong echo return from the bottom. An implementation of this technique is comprised of means for digital timing the echo return at successively higher amplitude with respect to fixed references following the transmission of a sonic pulse, and means for storing the values with navigational position data for later analysis. The presence of a pool is indicated by a change in the rate at which the fixed reference levels are exceeded by an echo signal.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
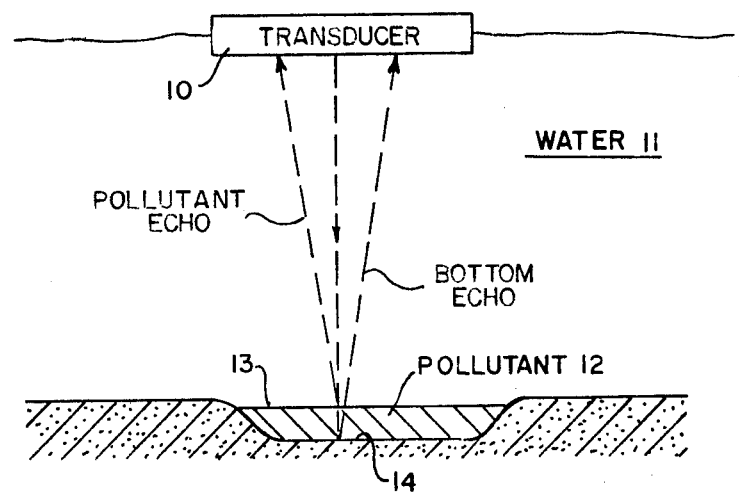
FIG. 1 is a sound-path diagram of an ultrasonic transducer used in accordance with the present invention. Note that the paths, normally superimposed, have been separated for clarity.

The method of locating a pool or layer of pollutant in accordance with the present invention will first be described in general with reference to FIGS. 1 and 2. FIG. 1 shows an ultrasonic wave propagating from a transducer 10 through a body of water 11 into a pool of a pollutant 12 of dense hazardous material, such as CCl$_4$ (p=1595 kg/m$^3$). Some of the incident acoustic wave is reflected from the surface 13 of the pollutant, and some penetrates the pollutant, setting up an acoustic wave in that medium. The dimensions of the transducer are greatly exaggerated in order to separate the sound paths for clarity. They are actually superimposed. In practice, the transducer will be virtually a point source of a circular ultrasonic beam typically with −3 dB beamwidth of 9° at 200 kHz, although a 1 MHz transducer may be used which has a −3 dB of 1.5°, a maximum power rating at 10% duty of 100 W, and a theoretical maximum effective depth of 33 meters (100 ft).

The penetrating wave will be reflected from the bottom 14 of the watercourse. This reflected wave will travel back through both mediums to the transducer with a round trip time greater than the normal time for the wave reflected from the pollutant surface 13. The difference is equal to twice the time it takes to pass through the pollutant layer or pool.

Figure 2:
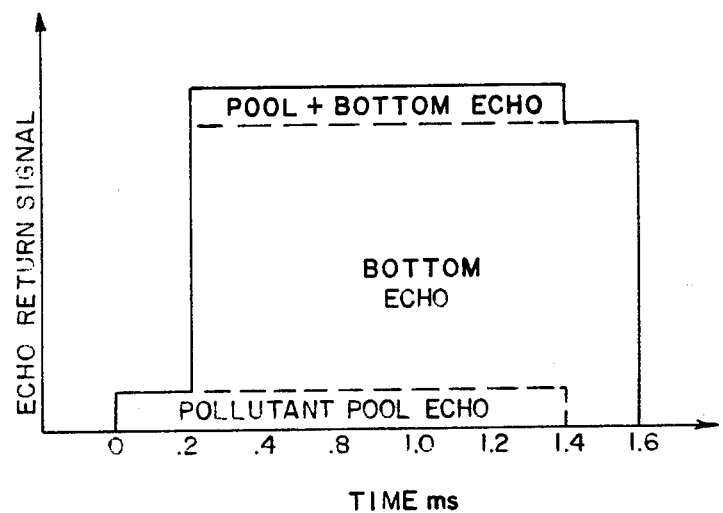
FIG. 2 is a graph of an idealized echo return signal envelope from a squarewave pulse envelope showing a characteristic of a precursor echo return indicative of a pollutant pool.

The pollutant pool echo signal from a 1.4 ms square-wave envelope is plotted in FIG. 2 together with the bottom echo signal for a layer of CCl$_4$ only 0.2 meters thick. The time at which the pollutant echo return is first sensed by the transducer 10 is indicated as time zero on the time scale. The initial echo return time from the pollutant surface 13 is proportional to twice the water depth, but since that depth is not of immediate concern in locating and mapping the pool of pollutant, that initial echo return time is not measured.

The bottom echo return time is proportional to twice the water depth time plus twice the transit time in the pollutant. The presence of the pollutant is thus indicated by the precursor echo signal that can be distinguished from the normal bottom echo signal, and if the material of the pollutant is known, the thickness of the pool can be determined from a measurement of the duration of the precursor, which in this case is the time to the strong bottom echo signal from time zero. This is because the speed of sound in a fluid is known to be $v = \sqrt{B/\rho}$, where B is the bulk modulus of the fluid and $\rho$ is the fluid density. Consequently, once the material of the pollutant is known, the speed of sound can be determined, and from that the thickness of the pollutant layer can be determined from the time duration of the precursor. For CCl$_4$, the duration of 0.2 ms indicates a thickness of 0.1 meters for it is known that sound will propagate through CCl$_4$ at the rate of 938 meters per second.

The speed of sound in insoluble sinking pollutants will always be less than in water because the fluid density will be greater in order for it to sink. For carbon tetrachloride, the speed of sound is only 63% of that in fresh water. This causes the sound to slow down, and increases the depth resolution between the pollutant surface 13 and the waterway bottom 14. In order to facilitate differentiating the pollutant and the bottom echo return signals, the ideal pulse width of the transmit signal would be short enough so that the return signals do not overlap in time and combine to form one continuous return signal, but by proper amplification, the precursor can still be detected and timed to the moment the bottom return begins even though there is overlapping, as in FIG. 2.

The depth of penetration of acoustic signals is dependent upon the frequency of the signal and the absorption coefficient of the medium. The absorption of sound in water increases as the frequency is increased. Since the pollutant mapping system of the present invention will be used in fresh water, a maximum depth of about 16 meters (52 feet) may be selected in choosing the optimum frequency. The choice of ultrasonic frequency is based on a trade off between penetration of the water, where high frequency is a limiting factor, and reflection from the pollutant, where low frequency is a limiting factor. A 1 MHz transducer is effective in 33 meters of water, and a 200 kHz transducer is commonly used in depth sounders and fish finders. Thus, the optimum frequency will be found between the 1 MHz and the commonly used 200 kHz, depending upon the depth of the waterway. The latter has been successfully tested, but, for better reflection from the pollutant, a higher frequency is desirable with 1 MHz as the approximate upper limit.

Figure 3:
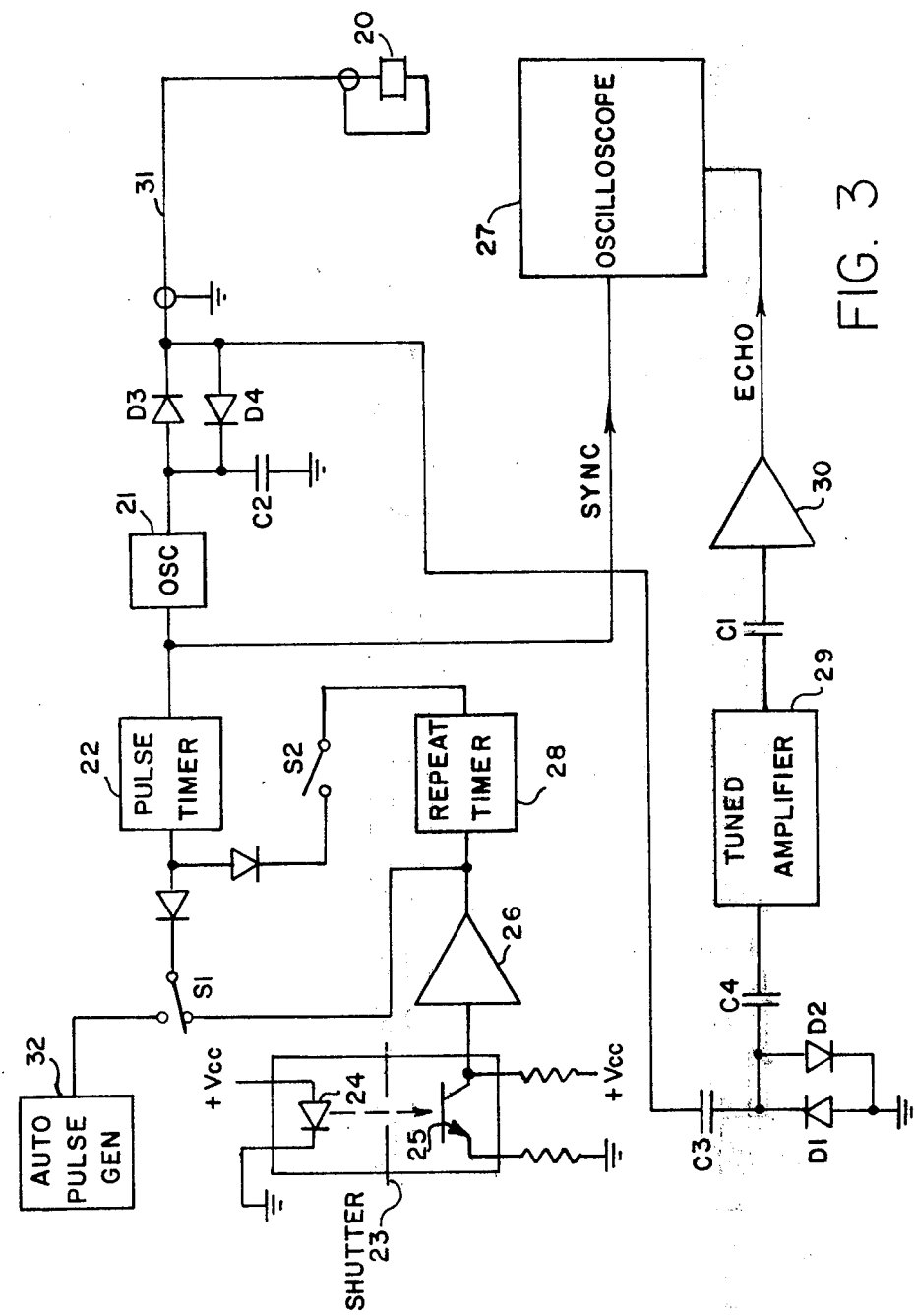
FIG. 3 is a schematic diagram of an ultrasonic transmitter-receiver for use in the present invention.
Figure 4:
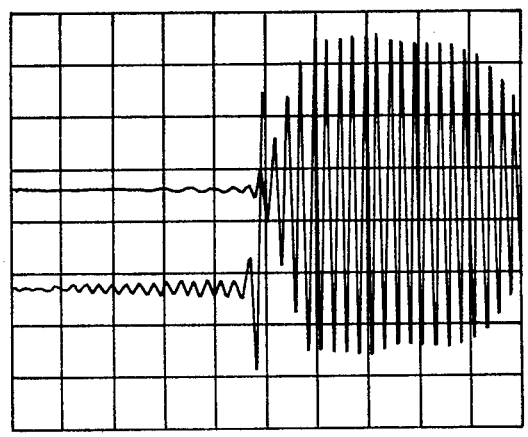
FIG. 4 illustrates an oscilloscope display of high and low sensitivity echo returns from a clean bottom of a waterway.
Figure 5:
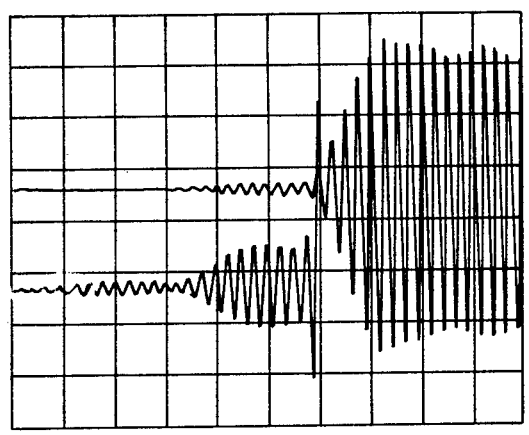
FIG. 5 illustrates an oscilloscope display of high and low sensitivity echo returns from a polluted bottom of a waterway.

In an exemplary embodiment shown in FIG. 3, an oscilloscope display is used to reproduce, detect and time the precursor, as shown in FIGS. 4 and 5. A piezoelectric transducer 20 is pulsed by a signal from a tunable oscillator 21 tuned to the natural frequency of the transducer selected, such as 1 MHz, for a period determined by a pulse timer 22, set to about 60 microseconds or less. The pulse timer 22, which may be a commercial 555 timer, is triggered by a shutter 23 which interrupts light from a photo diode 24 to a phototransistor 25. The pulse thus produced at the collector of the phototransistor is amplified by a single stage amplifier 26 to trigger the timer 22 via a switch S1. The shutter 23 is synchronized with a camera (not shown) and may in fact be implemented with the shutter of the camera which photographs traces of the echo return signals on the face of an oscilloscope 27. FIGS. 4 and 5 are typical of the traces photographed in a laboratory using a pulse width of about 100 microseconds. In the field, a camera is not used; instead an operator observes the oscilloscope directly, as will be described more fully below.

If a repeat ultrasonic pulse is desired during the same shutter cycle, a switch S2 may be closed to again trigger the pulse timer 22 after a delay time set by a repeat timer 28 just sufficient to produce another return signal for display on a dual trace oscilloscope. The oscilloscope may then be programmed to display traces for the return signals of both ultrasonic pulses. In that regard, it should be noted that in each of FIGS. 4 and 5, two ultrasonic pulse echo signals are displayed using the alternate mode of the switch S2 closed to utilize the repeat timer 28 and a dual trace oscilloscope. One channel uses a high gain amplifier to reproduce the precursor, if any, in the lower trace, and the other channel uses a low gain amplifier to reproduce the bottom echo signal in the upper trace. The two channels are used because the high gain necessary to reproduce the precursor saturates the channel for the bottom echo signal, and the low gain necessary to avoid saturation of the display with the bottom echo signal is too low to reproduce the precursor.

FIG. 4 shows a bottom echo signal without a precursor, indicating no pollutant. This is indicated by the lack of any significant signal showing in the lower trace until the bottom echo signal is clearly present in the upper trace. FIG. 5 shows a bottom echo signal with a precursor. This precursor is easily identified, and while it will not appear suddenly, because the edge of the pollutant pool may taper in thickness, the operator may very quickly sense when a precursor signal is growing ahead of the bottom echo signal to mark the edge of a pool with fair accuracy. It should be recalled that the precursor signal disappears in the lower trace once the bottom echo signal is present because the gain for the lower trace is so high that the electron beam for the lower trace is deflected completely off the screen by the bottom echo signal. In both FIG. 4 and FIG. 5, the horizontal sweep of the oscilloscope is delayed until just before any echo return is expected in order to use the full horizontal sweep for display with greater resolution. And in each figure, the signal displayed is 50 mV per division for the lower trace and 500 mV per division in the upper trace. The scale of the horizontal sweep is 20 microseconds per division.

Both of the amplifying channels are in the oscilloscope 27 which is coupled to the transducer 20 by a receiver comprised of a tuned amplifier 29 ac coupled to a second amplifier 30 by a capacitor C1. Diodes D1 and D2 limit the amplitude of the signal into the amplifier 29 so that on transmitting a pulse, the amplifiers 29 and 30 will not be damaged. Diodes D3 and D4, together with capacitor C2, function to dampen any ringing that may otherwise occur on a coaxial cable 31 connecting the transducer 20 to the oscillator 21 and to the receiver. A capacitor C3 provides ac coupling from the cable 31 to the receiver channel, and a capacitor C4 provides ac coupling from the limiting diodes to the tuned amplifier.

The instrument described with reference to FIG. 3 is intended for use in the field by an operator who observes the oscilloscope in real time, in which case a camera is not used with the oscilloscope and a shutter does not trigger the pulse timer 22. Instead an automatic pulse generator 32 is used. That is readily accomplished by placing the switch S1 in its alternate position. The pulse generator 32 is adjustable for the speed of the vessel. When the operator first observes a precursor, he marks the vessel's position, either directly in the waterway by throwing a marker buoy overboard, or indirectly on a chart. If an automatic navigation system is used, such as a system with a separate oscilloscope display of position on an overlay, the operator simply marks an X at that position on the overlay with a grease pencil. The operator also marks the position where the precursor signal no longer appears in a trace on the oscilloscope after it once appeared. By making repeated parallel or crisscross passes over the probable area of the pollutant pool thus found, the bounds of the pollutant pool may be mapped. Once mapped, rapid cleanup can be directed.

When using an oscilloscope display for mapping, it should be apparent that only the positive half cycles of the echo signal are required. It would therefore be within the scope of this invention to use a rectifier in the receiver amplifier. This would double the dynamic range of the oscilloscope. It should also be recognized that the rectifier may be a full wave rectifier to double the resolution of the oscilloscope.

To relieve the operator of this chore of watching the oscilloscope and marking the bounds of a pool, the operators functions may be easily automated by threshold detecting the presence of a precursor signal, marking the position of the vessel each time, and logging for later analysis the time in microseconds for the precursor signal to terminate, usually by the occurrence of a bottom return signal, although that is not necessarily the case if the pollutant pool is actually floating some distance off the bottom of the waterway. In that case, there will be a time lapse observed between the disappearance of the precursor and the echo signal from the bottom. The duration of the precursor is then logged, rather than the time to the bottom echo signal. This duration of the precursor is then a measure of the thickness of the pool.

Figure 6:
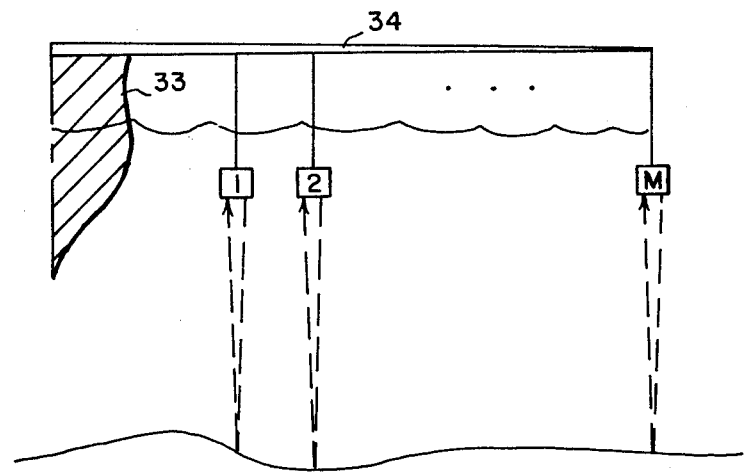
FIG. 6 illustrates the manner in which a plurality of ultrasonic transducers are used to sweep a wide swath in mapping pools of pollutants.

In order to be able to scan a larger swath of a waterway for more rapid mapping, multiple sensors 1, 2 . . . M may be deployed from the side of a vessel 33 on a boom 34 as shown in FIG. 6. Each sensor may be instrumented as shown in FIG. 3 using only the automatic pulse generator, but since an operator could not watch so many oscilloscopes without rapid fatigue, the oscilloscopes should be replaced with some automatic system for detection of a precursor echo return. The system may then include an on board audio alarm signaling the operator to mark the position of the vessel, either by throwing an anchor buoy overboard or marking the vessel's position on a navigation chart, such as an overlay on an oscilloscope where the electron beam is maintained at the current position by a separate navigation system.

Figure 7:
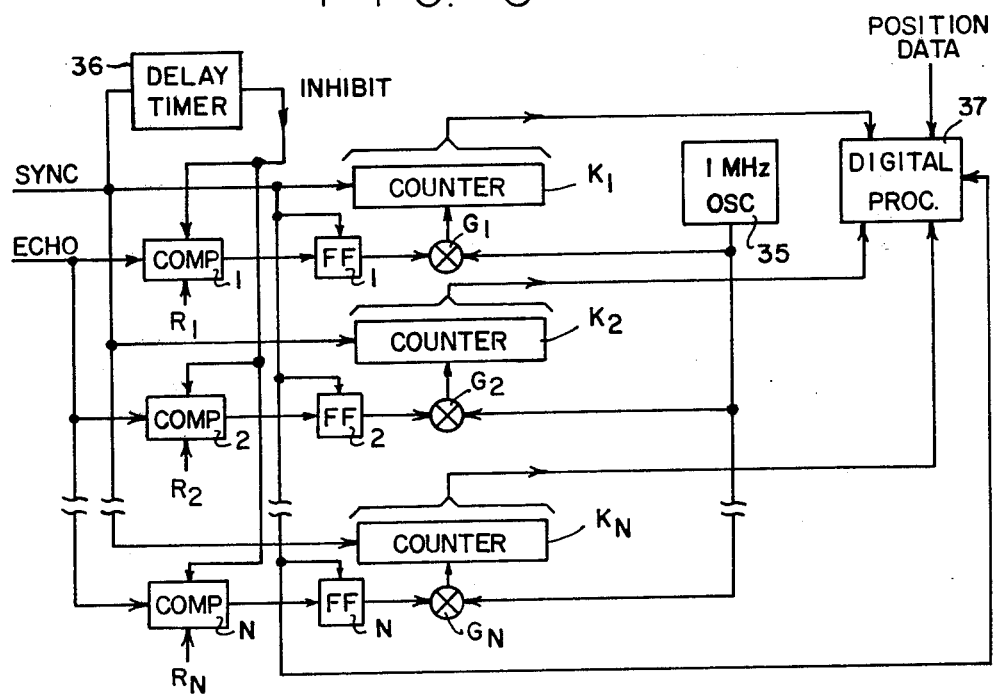
FIG. 7 illustrates an exemplary digital technique for automatically monitoring and logging the outputs of a transducer in the case of multiple transducers for sweeping a wide swath.

A preferred implementation of a multiple sensor system would simply log data from the sensors in real time, together with precise navigational data for later analysis. An actual map of the pollutant pools could then be generated by off line processing of the recorded data. A digital system which would replace the oscilloscope and camera in such a multiple sensor array is shown in FIG. 7. The sync signal from the pulse timer resets a bank of counters $K_1, K_2 \ldots K_N$ to begin counting clock pulses from an oscillator 35 operating at 1 MHz once gates $G_1, G_2 \ldots G_N$ are enabled. These gates are enabled by respective flip-flops $FF_1, FF_2 \ldots FF_N$ which are set by the sync pulse so the counters will all start counting together. Then the individual counters will stop counting as their respective flip-flops are reset by the outputs of a bank of comparators $COMP_1, COMP_2 \ldots COMP_N$ set to compare the amplitude of the echo return signal from the amplifier 30 (FIG. 3) with preset reference voltages $R_1, R_2 \ldots R_N$. However, in order not to compare a return signal until after the receiver amplifiers have settled down following the transmission of a sonic pulse, a delay timer 36 triggered by the sync pulse inhibits the comparators until just before an echo signal is received from the bottom, or from a pool of pollutant.

Figures 8, 9:
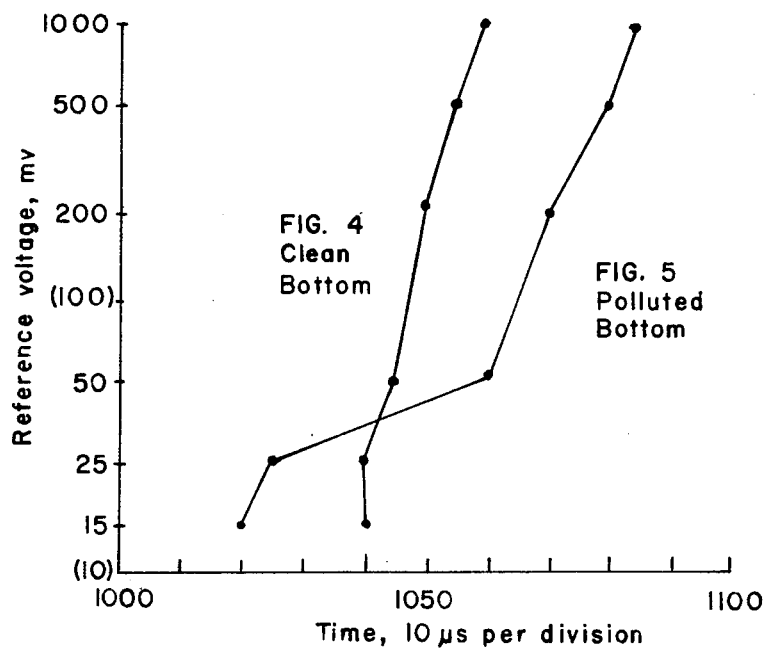
FIG. 8 is a table illustrating digital data logged for the two echo returns of FIGS. 4 and 5.
FIG. 9 is a plot of the logged data of FIG. 8.

Assuming comparators for six reference voltage levels as shown in FIG. 8, the six counters will be stopped at six successive times for the assumed echo signals of FIGS. 4 and 5. Once these times are plotted, as shown in FIG. 9, it is evident that the plot of times for a clean bottom return of FIG. 4 is linear, whereas the plot of time for the polluted bottom return of FIG. 5, has a well defined change in slope between the low rate of change during the growth in amplitude of the precursor signal to a high rate of growth in amplitude of the bottom signal. Also the bottom signal is offset to the right in the time scale for the polluted bottom due to the slower propagation of sound waves through the pollutant than through the water to the bottom. This low rate of change in the growth of the return signal amplitude may be easily detected by an algorithm in a digital processor 37. So if geographic position data is recorded with each set of six clock times in the digital processor, a map of pollutants in a waterway can be generated. This could, of course, be done on board, but in practice the data would be carried, or communicated to an on shore computer for off line processing. One advantage of an on shore computer is that more than one vessel may be used to sweep an area for faster mapping.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. A method for locating and mapping a pool of a pollutant in a body of water comprising the steps of
   - scanning the bottom of said body of water with ultrasonic energy using a transducer periodically pulsed to project pulse envelopes of acoustic energy downwardly to the bottom of said body of water,
   - receiving echo signals reflected upwardly from said bottom, and receiving precursor echo signals reflected upwardly from a reflective interface between the water and the surface of a pool of pollutant, if present,
   - detecting the presence of an echo signal from said interface between the water and a pool of pollutant as a precursor to a bottom echo signal for determining the presence of said pool of pollutant at the navigational position of the transducer as the process of scanning continues, and
   - marking said navigational position.

2. A method as defined in claim 1 including determining the thickness of said pool of pollutant from the duration of said precursor, and the separation, if any, between the precursor and the bottom echo signal.

3. A method as defined in claim 1 wherein said echo returns are displayed on an oscilloscope for visually detecting the presence of said precursor, and determining the duration of said precursor and the separation, if any, between the precursor and the bottom echo signal.

4. A method as defined in claim 3 wherein each echo signal displayed on said oscilloscope is delayed to display only the expected bottom echo signal and any precursor that may be present, and said precursor, if any is displayed on a separate trace from said bottom echo signal with greater amplification, thereby to bring out and display in magnified form any precursor present before the bottom echo signal.

5. A method as defined in claim 1 wherein amplitudes of said echo signals are converted from analog to digital form in order to determine by digital data analysis the presence and duration of precursors to echo signals from said bottom.

6. A method as defined in claim 5 wherein analog-to-digital conversion is accomplished by comparing the echo signals with a plurality of different reference voltages, and as each reference voltage is exceeded, recording the relative time at which the reference voltage is exceeded, whereby the presence of a pool of pollutant is determined by the difference in the rate at which successive lower reference voltages are exceeded relative to the rate at which successive higher reference voltages are exceeded.

7. A method as defined in claim 6 including recording the navigational position of said transducer at the time of each bottom echo signal for later analysis.

8. Apparatus for locating and mapping a pool of pollutant in a body of water comprising
   - means for projecting pulse envelopes of acoustic energy downwardly to the bottom of said body of water from different navigational positions in said body of water,
   - means at the same navigational position as said projecting means for receiving echo signals reflected upwardly from each pulse envelope projected downwardly, and
   - means for detecting the presence of a low echo signal as a precursor to a high amplitude echo signal from the bottom as an indication of the presence of a pollutant pool through which acoustic energy must pass for reflection from said bottom.

9. Apparatus as defined in claim 8 wherein said means for projecting acoustic energy in said pulse envelope produces acoustic energy at a frequency selected from a range about 200 kHz and 1 MHz.

10. Apparatus as defined in claim 9 wherein said means for projecting acoustic energy produces said pulse envelope less than about 60 microseconds long.

11. Apparatus as defined in claim 8 wherein said means for detecting said precursor is comprised of an oscilloscope for display of the echo return from each projected pulse envelope in two traces, one with a much greater amplification for display of said precursor, whereby a precursor, if any, appears in one trace before said bottom echo signal in the other trace.

12. Apparatus as defined in claim 8 wherein said means for detecting said precursor is comprised of means for converting samples of each echo signal from each projected pulse envelope from analog into digital form together with the time of each sample, and means for recording all such converted echo return data for later analysis.

13. Apparatus as defined in claim 12 including means for recording with data for each echo signal additional navigational position data for later analysis.

14. Apparatus as defined in claim 12 or 13 wherein said converting means is comprised of a plurality of means for comparing the amplitude of each echo signal with a plurality of successively higher reference voltages and means for measuring the time each reference level is exceeded.

* * * * *